United States Patent [19]

Chen

[11] Patent Number: 5,755,141
[45] Date of Patent: May 26, 1998

[54] MEANS FOR ADJUSTING POSITIONS OF A BICYCLE'S HANDLEBAR

[75] Inventor: Chao-hu Chen, Taichung Hsien, Taiwan

[73] Assignee: Kalloy Industrial Co., Ltd., Taichung Hsien, Taiwan

[21] Appl. No.: 534,690

[22] Filed: Sep. 27, 1995

[51] Int. Cl.$^6$ .................................................. G05G 1/14
[52] U.S. Cl. ..................... 74/551.3; 74/551.1; 74/551.4; 280/279; 403/71; 403/82
[58] Field of Search ........................ 74/551.1–551.8; 280/279; 403/69–72, 82, 84, 91, 96, 102, 103

[56] References Cited

U.S. PATENT DOCUMENTS

| | | | |
|---|---|---|---|
| 908,177 | 12/1908 | Watters | 74/551.3 |
| 921,457 | 5/1909 | Purdum | 74/551.3 |
| 1,578,634 | 3/1926 | Bourgmann | 403/82 |
| 2,484,551 | 10/1949 | Brouse | 74/522 |
| 4,568,121 | 2/1986 | Kashima | 403/82 X |
| 5,373,757 | 12/1994 | Bigall | 280/279 X |
| 5,465,634 | 11/1995 | Chen | 74/551.1 |
| 5,509,328 | 4/1996 | Lai | 74/551.3 |
| 5,515,744 | 5/1996 | Liao | 74/551.3 |

FOREIGN PATENT DOCUMENTS

0497429 A1  8/1992  European Pat. Off. ............. 74/551.3

*Primary Examiner*—Vinh T. Luong
*Attorney, Agent, or Firm*—William E. Pelton

[57] ABSTRACT

A device for adjusting positions of a bicycle's handlebar is engaged to a steerer tube and includes a base element and a pivotal element which receives the handlebar therein, the base element is securely engaged to the steerer tube, the pivotal element has a second hole defined transversely therein for receiving a rod therein and two slots defined in a toothed under surface of the pivotal element, which communicate with the second hole, the base element has two-fourth holes defined therein and a toothed surface defined in an upper surface thereof for the toothed surface of the pivotal element to engage with the threaded surface of the base element and two bolts extend through the fourth holes, the two slots and to threadedly engage with threaded holes defined in the rod received in the second hole such that the handlebar and the pivotal element can be pivoted corresponding to an axis of the rod.

3 Claims, 6 Drawing Sheets

5,755,141

1

MEANS FOR ADJUSTING POSITIONS OF A BICYCLE'S HANDLEBAR

BACKGROUND OF THE INVENTION

1. Field of Invention

The present invention relates to a means for adjusting a handlebar of a bicycle to a lower and closer or a higher and farther positions corresponding to the rider.

2. Related Prior Art

Generally, a bicycle's handlebar stem comprising a vertical portion which received in a steerer tube of the bicycle and a horizontal portion which transversely receives the handlebar therein, the position of the handlebar corresponding to a rider of the bicycle only can be adjusted by pulling from or pushing in the vertical portion of the handlebar stem corresponding to the steerer tube, such an adjustment can only adjust the height in a direction along a longitudinal axis of the steerer tube. However, a satisfactory riding condition for the rider of the bicycle requires not only the height of the handlebar extending from the steerer tube, but also the distance between the handlebar and the rider such that a shorter rider and the taller rider both can hold the handlebar with the most satisfactory way. Therefore, there is a need for the rider to adjust a position of the handlebar closer to or farther from the rider such that the riders with different heights may ride the bicycle satisfactorily.

Another type of bicycle has a handlebar which is securely received in a clamp element and the clamp element is securely engaged to the steerer tube directly, nevertheless, the problems are maintained still.

The present invention intends to provide a means which adjusts the handlebar closer or farther from the rider so as to mitigate and/or obviate the above-mentioned problems.

SUMMARY OF THE INVENTION

The present invention provides a means for adjusting positions of a bicycle's handlebar and which is engaged to a steerer tube and includes a base element and a pivotal element, the pivotal element receives the handlebar therein and the base element is securely engaged to the steerer tube, the pivotal element has a second hole defined transversely therein for receiving a rod therein and two slots defined in a toothed under surface of the pivotal element and communicating with the second hole, the base element has two fourth holes defined therein and a toothed surface defined in an upper surface thereof for the toothed surface of the pivotal element to engage with the threaded surface of the base element, two bolts extend through the fourth holes, the two slots and to threadedly engage with threaded holes defined in the rod received in the second hole such that the handlebar and the pivotal element can be pivoted corresponding to an axis of the rod.

It is an object of the present invention to provide a means which connects the steerer tube and the handlebar, the means including a pivotal element to receive the handlebar and a base element to be engaged to the steerer tube, the handle and the pivotal element can be pivoted about an axis perpendicular to that of the steerer tube.

Other objects, advantages, and novel features of the invention will become more apparent from the following detailed description when taken in conjunction with the accompanying drawings.

2

Figure 2:
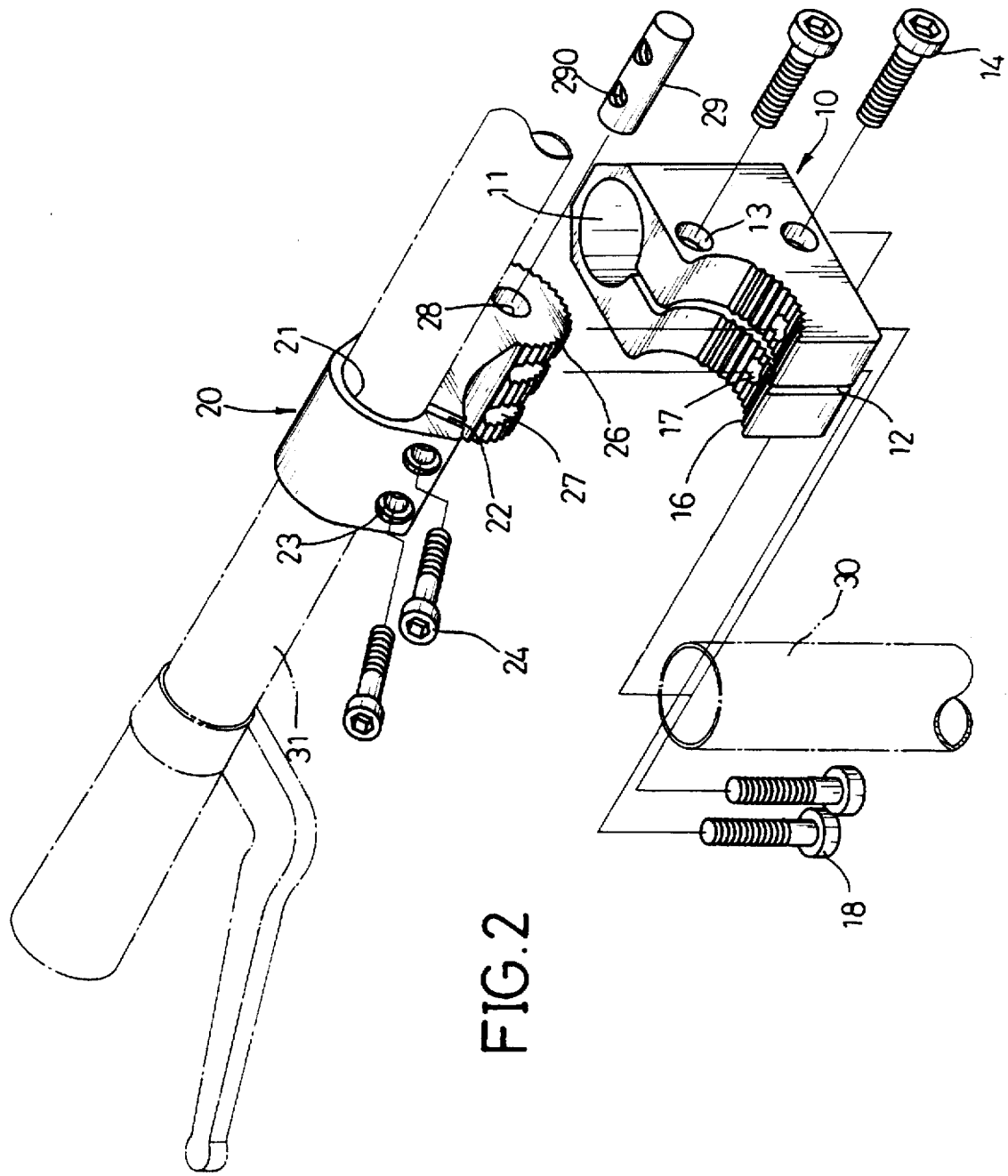
Figure 3:
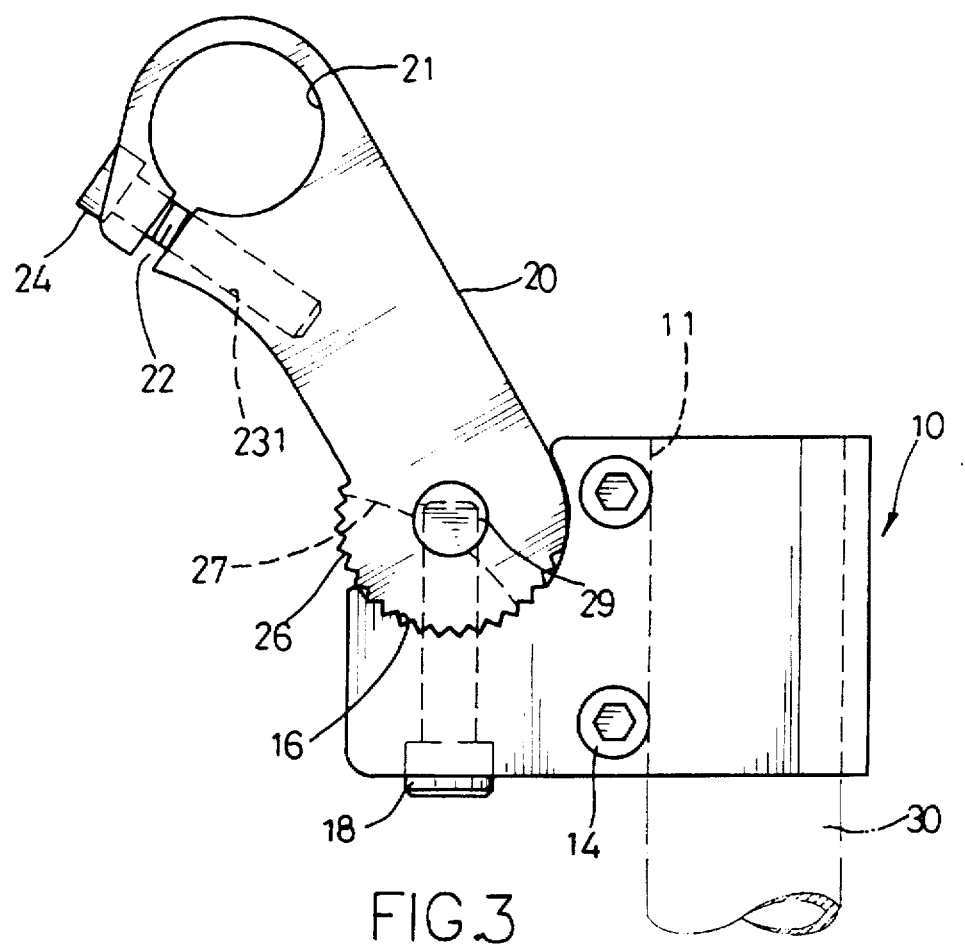
Figure 4:
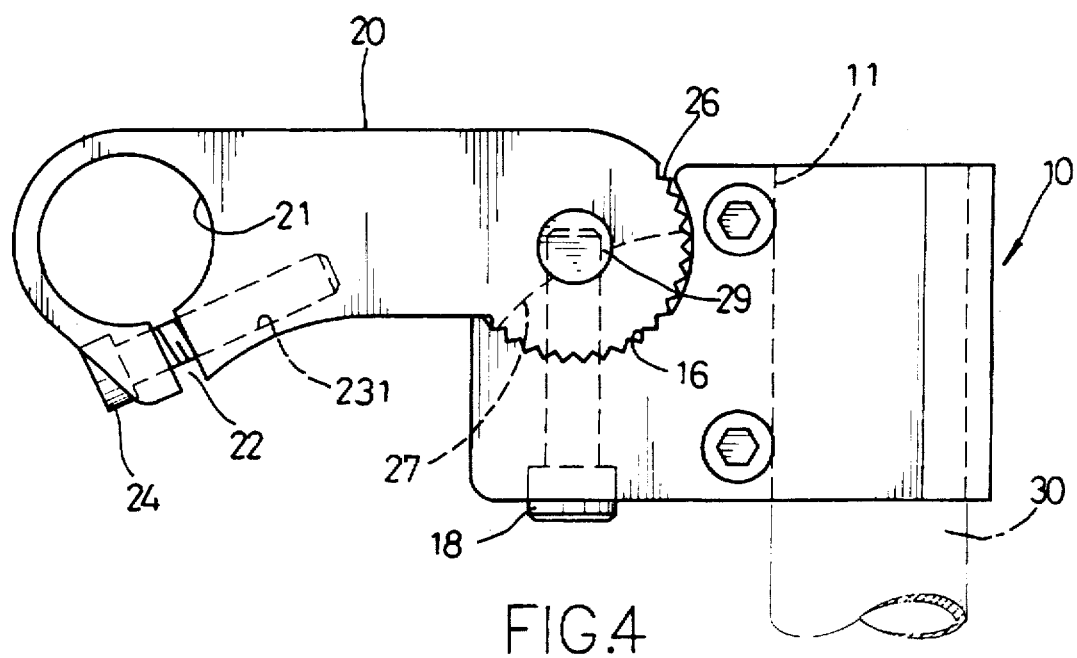
Figure 5:
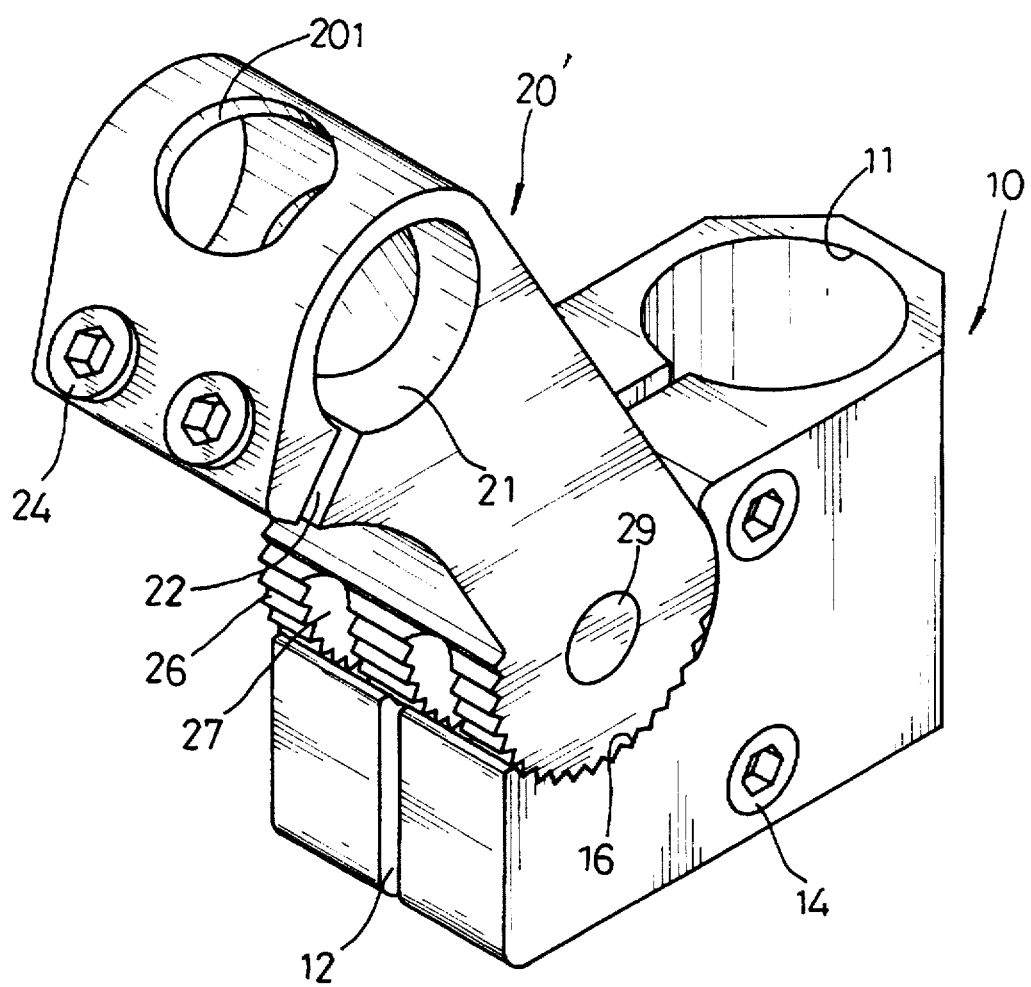
Figure 6:
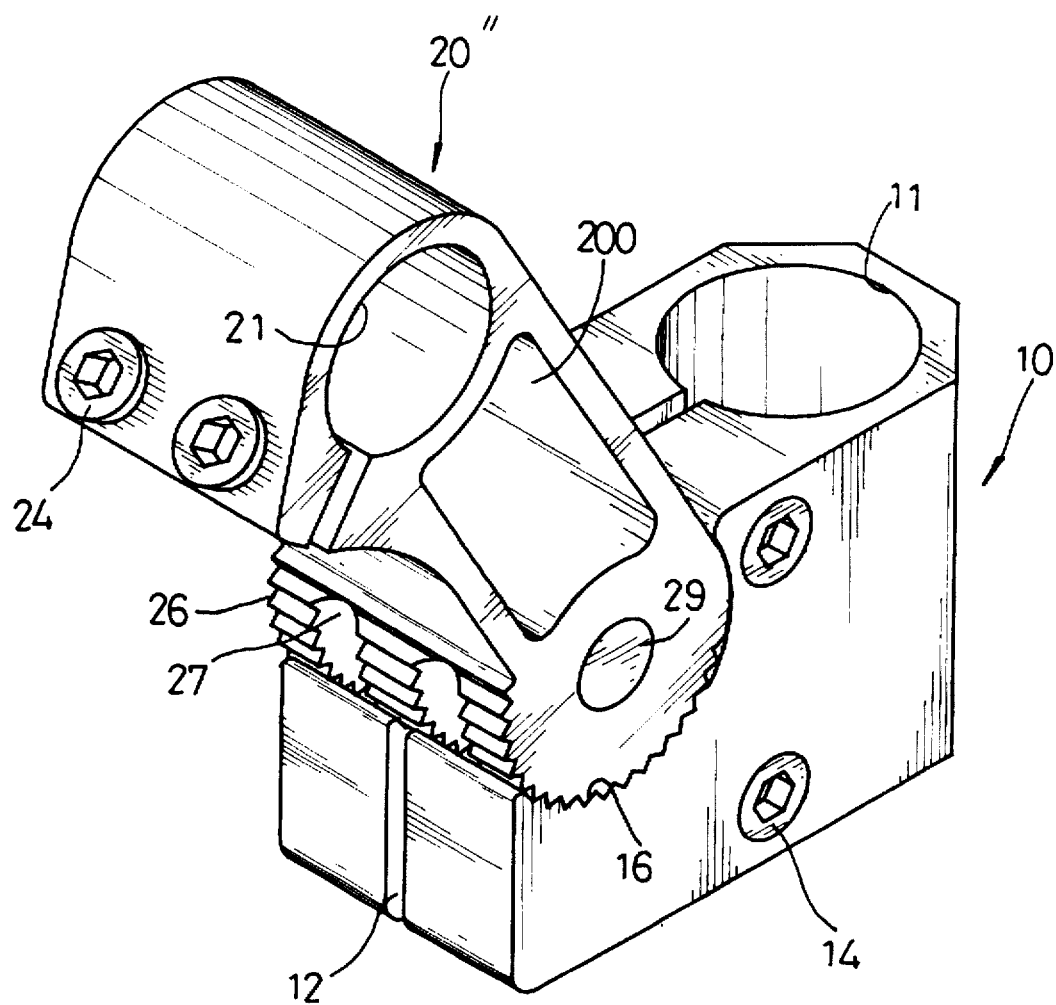
Figure 7:
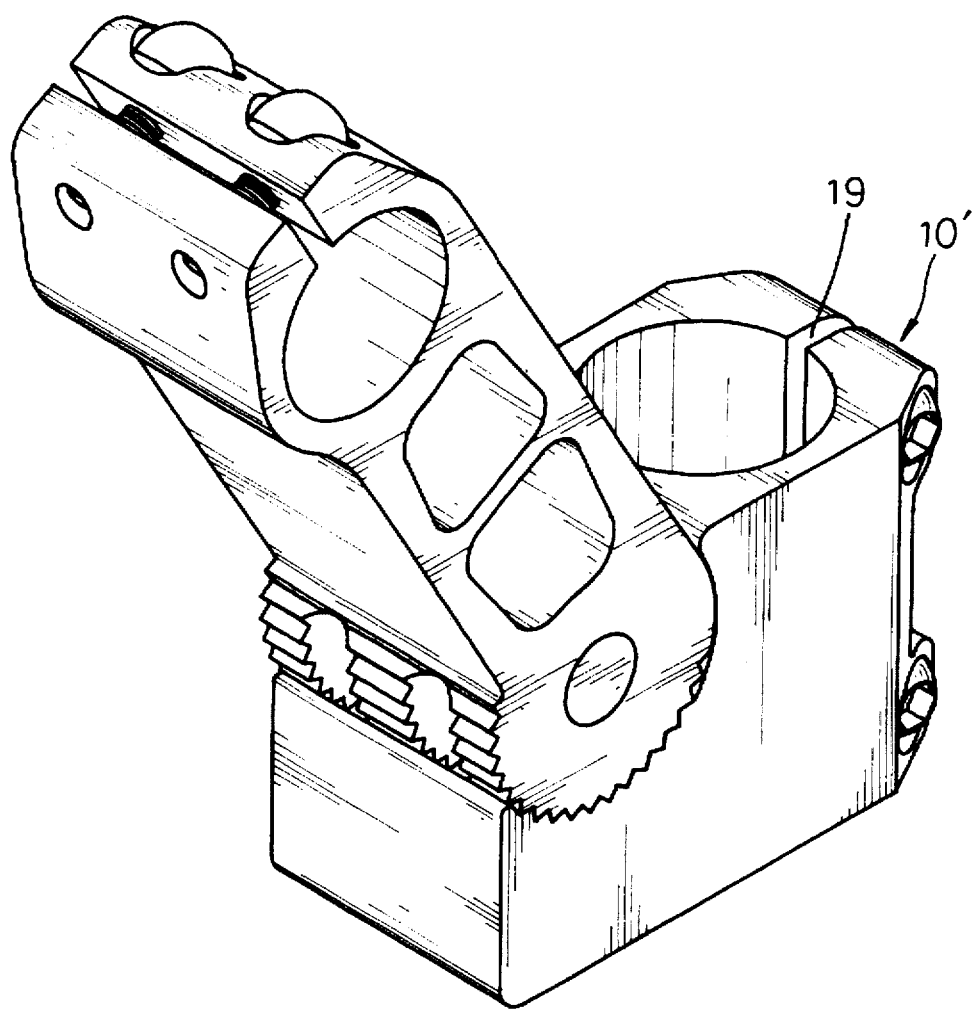

(shown in phantom lines) and disposed to a steerer tube (shown in phantom lines);

FIG. 2 is an exploded view of the means, the handlebar (shown in phantom lines) and the steerer tube (shown in phantom lines) in accordance with the present invention;

FIG. 3 is a side illustrative view of the means, the handlebar (shown in phantom lines) and the steerer tube (shown in phantom lines);

FIG. 4 is a side illustrative view of the means, the handlebar (shown in phantom lines) and the steerer tube (shown in phantom lines), wherein the handlebar is adjusted to a horizontal position;

FIG. 5 is a perspective view of another embodiment of the means in accordance with the present invention wherein the handlebar has a material-saving hole;

FIG. 6 is a perspective view of yet another embodiment of the means in accordance with the present invention wherein the handlebar has another material-save hole; and FIG. 7 is a perspective view of another embodiment of the means in accordance with the present invention wherein the handlebar has a different configuration and the means has another type of engaging design.

DETAILED DESCRIPTION OF THE PREFERRED EMBODIMENTS

Figure 1:
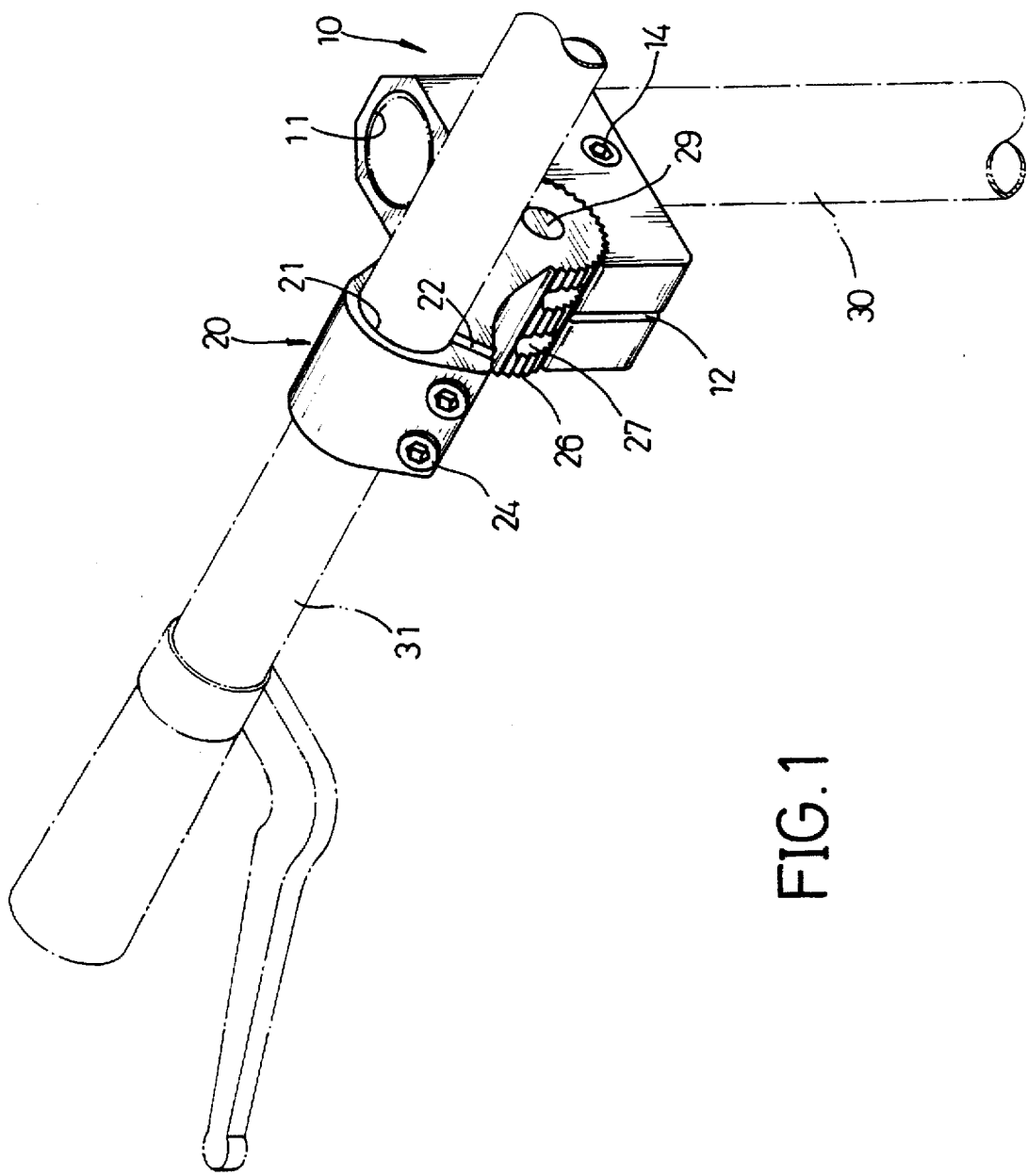
FIG. 1 is a perspective view of a means in accordance with the present invention equipped with a handlebar

Referring to the drawings and initially to FIGS. 1 and 2, a means for adjusting positions of a bicycle's handlebar in accordance with the present invention generally includes a pivotal element 20 and a base element 10, the pivot element 20 having a first end and a second end, the first end of the pivotal element 20 having a first hole 21 transversely therein for a handlebar 31 (shown in phantom lines) therein and the second end of the pivotal element 20 having a second hole 28 defined transversely therein for receiving a rod 29 therein. The second end of the pivotal element 20 has two slots 27 defined in an under side thereof, the two slots 27 communicating with the second hole 28 and the under side of the second end of the pivotal element 20 having a toothed and convex surface 26 defined therein.

The first end of the pivotal element 20 has a first slit 22 defined transversely therein and communicates with the first hole 21, the first end of the pivotal element 20 therefore is divided into two parts by the first slit 22. One of the two parts has two third threaded holes 231 (see FIG. 3) defined therein and the other part has two plain holes 23 defined therein for two third bolts 24 each extending through the plain holes 23 and threadedly engaging into the corresponding third threaded holes 231 to securely clamp the handlebar 31 in the first hole 21 of the pivotal element 20.

The base element 10 has a first end and a second end, the first end of the base element 10 having a third hole 11 defined vertically therein for a steerer tube 30 (shown in phantom lines) received in the third hole 11 and the second end of the base element 10 having two fourth holes 17 defined vertically therein, the second end of the base element 10 having a concave, toothed surface 16 defined in an upper side thereof corresponding to the toothed surface 26 of the pivotal element 20.

A second slit 12 is defined longitudinally in the base element 10 between the two fourth holes 17 and communicates with the third hole 11, two first holes 13 defined transversely in the base element 10 and communicating with the second slit 12 and extending thereafter, defining a first plain portion before the second slit 12 and a second threaded portion after the second slit 12 such that the base element 10 is securely engaged to the steerer tube 30 by extending a first bolt 14 through each of the two first holes 13 of the base element 10, firstly through the plain portion and secondly to engage with the threaded portion.

The rod 29 received in the second hole 28 of the pivotal element 20 has two second threaded holes 290 radially defined therein such that the toothed surface 26 of the pivotal element 20 is engaged with the toothed surface 16 of the base element 10 and two second bolts 18 each extend through the corresponding fourth hole 17 of the base element 10, the corresponding slot 27 of the pivotal element 20 and threadedly engage with the corresponding second threaded hole 290 of the rod 29.

Referring to FIGS. 3 and 4, the pivotal element 20 is securely engaged to the base element 10 by the second bolts 18 extending through the base element 10, the pivotal element 20 and threadedly engaging to the rod 29, and the position of the handlebar 20 is adjusted first by unthreading the second bolts 18 to disengage the second bolts 18 from the rod 29, then rotating the pivot element 20 corresponding to an axis of the rod 29 to a desired angle corresponding to an axis of the steerer tube 30, the final position is set by rethreading the second bolts 18 into the second threaded holes 290 of the rod 29.

Referring now to FIGS. 5 and 6, a different configuration of the pivotal element 20' can be made by adding a material-saving hole 201 defined longitudinally in the pivotal element 20'. Yet another configuration of the pivotal element 20" which has a material-saving hole 200 defined transversely therein.

FIG. 7 shows another embodiment of the means which base element 10' has a slit 19 defined in the first end of the base element 10 and communicates the third hole 11 thereof such that the second end of the base element 10' is an integral portion so as to have a good strength.

Accordingly, the present invention provides the means for adjusting positions of the bicycle's handlebar and the means has a simple structure and is easy to be operated.

Although the invention has been explained in relation to its preferred embodiment, it is to be understood that many other possible modifications and variations can be made without departing from the spirit and scope of the invention as hereinafter claimed.

What is claimed is:

1. A means for adjusting positions of a bicycle's handlebar and comprising:

a pivotal element having a first end and a second end, said first end of said pivotal element having a first hole defined transversely therein for receiving a handlebar therein, said second end of said pivotal element having a second hole transversely therein and having two slots defined in an underside thereof, said two slots communicating with said second hole and said underside of said second end of said pivotal element having a toothed surface defined therein;

a base element having a first end and a second end, said first end of said base element having a third hole defined vertically therein for a steerer tube received in said third hole and said second end of said base element having two fourth holes defined vertically therein, said second end of said base element having a toothed surface defined in an upper side thereof corresponding to said toothed surface of said pivotal element, and a rod having two second threaded holes radially defined therein and received in said second hole of said pivotal element such that said toothed surface of said pivotal element is engaged with said toothed surface of said base element and two second bolts each extend through said corresponding fourth hole of said base element, said corresponding slot of said pivotal element and threadedly engage with said corresponding second threaded hole of said rod.

2. The means as claimed in claim 1 wherein said first end of said pivotal element has a first slit defined transversely therein and communicates with said first hole, said first end of said pivotal element divided into two parts by the first slit and each of said two parts having two third partly threaded holes defined therein for two third bolts each threadedly engaging into said corresponding third threaded holes of said two parts.

3. The means as claimed in claim 1 wherein a second slit is defined longitudinally in said second end of said base element between said two fourth holes and communicating with said third hole, at least one first hole defined transversely in said base element and communicating with and extending beyond said second slit thereby forming a first plain portion and a second threaded portion such that said base element is securely engaged to said steerer tube by extending a first bolt through said first hole of said base element to threadedly engage with the second threaded portion.

* * * * *